United States Patent
Co et al.

(10) Patent No.: US 10,449,831 B2
(45) Date of Patent: Oct. 22, 2019

(54) AIR VENT FOR MITIGATING HOT AIR IN VEHICLE

(71) Applicant: FORD GLOBAL TECHNOLOGIES, LLC, Dearborn, MI (US)

(72) Inventors: Juanito Yu Co, Ann Arbor, MI (US); Leonard Anthony Shaner, New Baltimore, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 1299 days.

(21) Appl. No.: 14/311,552

(22) Filed: Jun. 23, 2014

(65) Prior Publication Data

US 2015/0367709 A1    Dec. 24, 2015

(51) Int. Cl.
*B60J 1/20* (2006.01)
*B60H 1/26* (2006.01)

(52) U.S. Cl.
CPC .............. *B60H 1/267* (2013.01); *B60H 1/265* (2013.01); *B60J 1/20* (2013.01)

(58) Field of Classification Search
CPC .............. B60H 1/265; B60H 1/267; B60J 1/20
USPC .................................................. 454/128–135
See application file for complete search history.

(56) References Cited

U.S. PATENT DOCUMENTS

| | | | |
|---|---|---|---|
| 1,783,276 A | 12/1930 | Bliss | |
| 3,434,408 A * | 3/1969 | Rivers | B60H 1/267 454/132 |
| 4,756,242 A * | 7/1988 | Keith | B60H 1/267 296/152 |
| 4,864,920 A * | 9/1989 | Inagaki | B60H 1/267 454/132 |
| 5,081,912 A | 1/1992 | Clenet | |
| 5,094,151 A | 3/1992 | Bernard | |
| 5,683,293 A | 11/1997 | Mohammed | |
| 5,797,645 A * | 8/1998 | Schenk | B60J 1/2002 296/152 |
| 6,042,473 A | 3/2000 | McClary | |
| 6,224,479 B1 * | 5/2001 | Iino | B60J 1/20 454/132 |
| 6,350,195 B1 * | 2/2002 | Iino | B60J 1/20 296/152 |
| 6,435,961 B1 | 8/2002 | Biancone | |
| 6,692,130 B1 | 2/2004 | Snow | |

(Continued)

FOREIGN PATENT DOCUMENTS

| | | |
|---|---|---|
| CN | 1876416 A | 12/2006 |
| CN | 203580570 U | 5/2014 |

(Continued)

OTHER PUBLICATIONS

English machine translation of DE19533596A1.

(Continued)

*Primary Examiner* — Vivek K Shirsat
(74) *Attorney, Agent, or Firm* — Vichit Chea; King & Schickli PLLC (57) ABSTRACT

An air vent is mounted in a vehicle window frame. The air vent includes a one-piece body having an interior face and an exterior face. An air pathway extends between a first opening in the interior face to a second opening in the exterior face. An elongated window channel is also provided in the body for receiving the window over which the air vent is mounted.

19 Claims, 6 Drawing Sheets

(56) References Cited

U.S. PATENT DOCUMENTS

| | | |
|---|---|---|
| 7,762,876 B2 | 7/2010 | McClary |
| 2004/0162017 A1* | 8/2004 | Pe'er .................. B60H 1/00264 454/131 |
| 2006/0199523 A1 | 9/2006 | Matthews et al. |
| 2006/0199563 A1 | 9/2006 | Kelly et al. |
| 2007/0135034 A1* | 6/2007 | Lack .......................... B60J 1/20 454/196 |
| 2012/0028563 A1 | 2/2012 | Sacks et al. |

FOREIGN PATENT DOCUMENTS

| | | |
|---|---|---|
| DE | 4437209 A1 | 8/1995 |
| DE | 19533596 A1 | 3/1997 |
| JP | 01190526 A | 7/1989 |

OTHER PUBLICATIONS

English machine translation of DE4437209A1.
English machine translation of CN1876416A.
English Machine translation of CN203580570U.
English Machine translation of JPH01190526A.
Office Action dated Apr. 23, 2018 for U.S. Appl. No. 14/612,723, filed Feb. 3, 2015.

* cited by examiner

AIR VENT FOR MITIGATING HOT AIR IN VEHICLE

TECHNICAL FIELD

This document relates generally to the vehicle ventilation field and, more particularly, to a ventilation device mounted in a vehicle window for ventilation exhaust of hot interior air from the vehicle.

BACKGROUND

Ventilation devices that may be fitted in the top of a frame of a vehicle window in order to ventilate hot air from the interior thereof are known in the art. Examples of such devices are disclosed in U.S. Pat. No. 7,762,876 to McClary, U.S. Pat. No. 6,224,479 to Iino, U.S. Pat. No. 5,683,293 to Mohammad, U.S. Pat. No. 4,864,920 to Inagaki and U.S. Pat. No. 3,434,408 to Rivers et al. As should be appreciated, such devices are generally overly complicated in construction and incorporate multiple components that increase their cost of production. Further, moving parts in the devices are subject to wear and tend to rattle over time to the annoyance of occupants of the vehicle.

This document relates to a new and improved air vent for mounting in the window frame of a vehicle. The air vent is characterized by simple and inexpensive once-piece construction that provides the desired ventilation for the release of hot air from the interior of a vehicle while advantageously eliminating any potential for creating annoying squeaks and rattles.

SUMMARY

In accordance with the purposes and benefits described herein, an air vent is provided for mounting in a vehicle window frame. The air vent comprises a one-piece body having an interior face and an exterior face. An air pathway is provided in the body. The air pathway extends from a first opening in the interior face to a second opening in the exterior face. In one useful embodiment the air pathway extends downwardly from the first opening to the second opening so as to better prevent the intrusion of rain or moisture into the interior of the vehicle. In another useful embodiment a water repellent film is provided in the air pathway. That water repellent film may be a thin porous membrane made, for example, from an expanded polytetrafluoroethylene material such as sold under the trademark Gore-Tex®. Other useful materials include thin plastic or metal with tiny holes and combinations thereof.

In one useful embodiment the air pathway includes a central cavity. A first portion of the air pathway extends between the first hole and the central cavity while a second portion extends between the second hole and the central cavity. In one possible embodiment the first portion and second portion of the air pathway are non-collinear. In another possible embodiment the first portion and second portion of the air pathway are non-planar and non-collinear. In yet another embodiment the air pathway further includes multiple first portions and multiple second portions.

In yet another embodiment the air vent includes a filter that is received and held in the central cavity. The filter is made from a material selected from a group consisting of cellulose, a porous foam filter medium, expanded polytetrafluoroethylene, such as sold under the trademark GORE-TEX®, silicone coated material that allows air to pass through but will not allow water to penetrate and combinations thereof. In one particularly useful embodiment the filter incorporates activated carbon to eliminate odors and contaminants from the air passing through the air pathway.

In accordance with additional aspects, the body of the device may include an elongated mounting flange. In one embodiment the body also includes an elongated window channel for receiving and holding the window that operates in the window frame in which the device is mounted. In one possible embodiment that window channel is open to the central cavity. In another possible embodiment the central cavity is separate from the window channel. In yet another possible embodiment the body has a substantially h-shaped cross section.

In the following description, there are shown and described several preferred embodiments of the air vent. As it should be realized, the air vent is capable of other, different embodiments and its several details are capable of modification in various, obvious aspects all without departing from the air vent as set forth and described in the following claims. Accordingly, the drawings and descriptions should be regarded as illustrative in nature and not as restrictive.

BRIEF DESCRIPTION OF THE DRAWING

The accompanying drawing incorporated herein and forming a part of the specification, illustrates several aspects of the air vent and together with the description serves to explain certain principles thereof. In the drawing.

Reference will now be made in detail to the present preferred embodiments of the air vent, examples of which are illustrated in the accompanying drawings.

DETAILED DESCRIPTION

Figure 1:
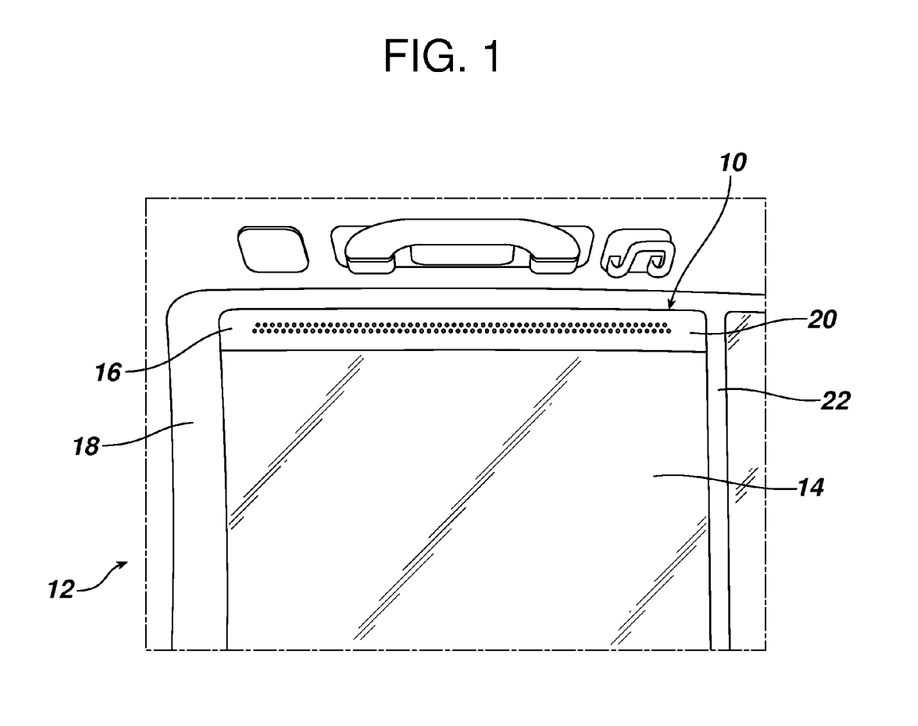
FIG. 1 is an interior elevational view illustrating the air vent mounted in the top portion of a vehicle window frame with the top of the window received in an elongated window channel provided in the air vent.

Reference is now made to FIG. 1 illustrating the air vent 10 mounted at the top of a vehicle window frame 12 and engaging the top of the window 14. As illustrated, the air vent 10 has a front end 16 adjacent the front portion 18 of the window frame 12 and a rear end 20 adjacent the rear portion 22 of the window frame.

Figure 2:
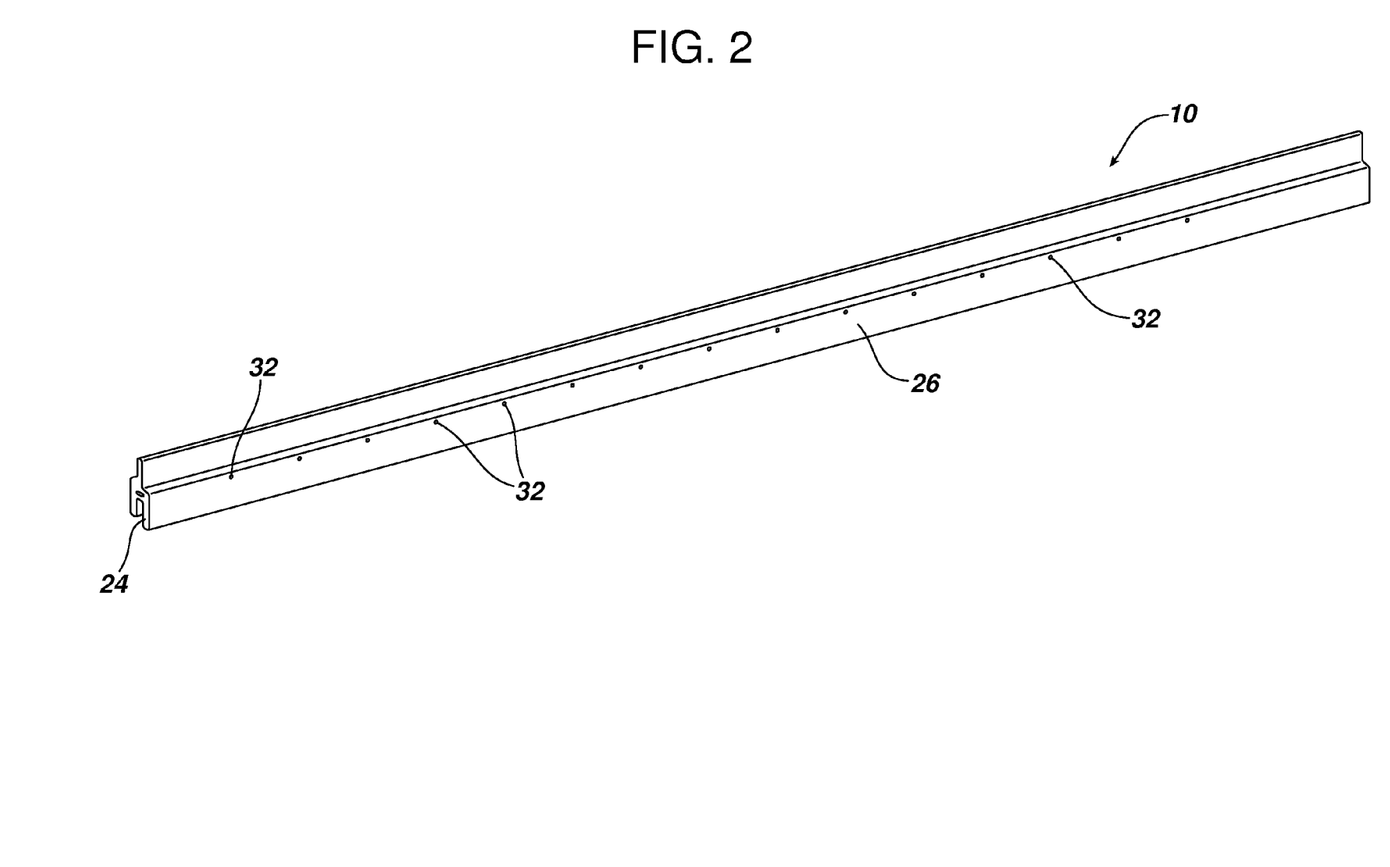
FIG. 2 is a perspective view of the interior face of another embodiment of the air vent.
Figure 3A:
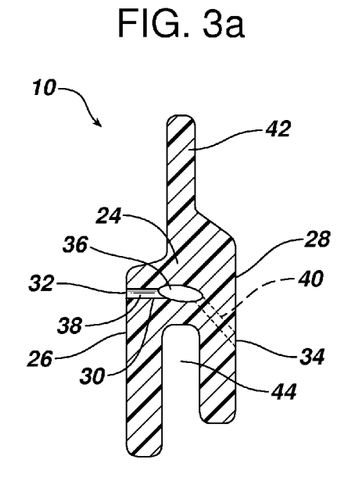
FIGS. 3a and 3b are cross-sectional views of one embodiment of the air vent wherein the first and second portions of the air pathway are non-planar and non-collinear.
Figure 3B:
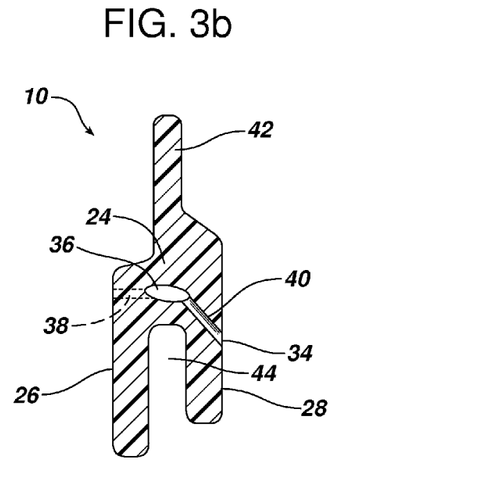

As best illustrated in FIGS. 2, 3*a* and 3*b*, the air vent 10 includes a one-piece body 24 having an interior face 26 and an exterior face 28. An air pathway 30 extends from a first opening 32 in the interior face 26 to a second opening 34 in the exterior face 28.

In the FIGS. 3*a* and 3*b* embodiment, the air pathway includes a central cavity 36 with a first portion 38 of the air pathway extending between the first opening 32 and the central cavity and a second portion 40 of the air pathway extending from the central cavity to the second opening 34.

As further illustrated in FIGS. 3*a* and 3*b*, the body 24 is generally h-shaped and further includes an elongated mounting flange 42 and an elongated window channel 44. As should be appreciated, the elongated central cavity 36 is positioned between the elongated mounting flange 42 and the elongated window channel 44. The significance and function of the elongated mounting flange 42 and elongated window channel 44 will be discussed in detail below.

In the embodiment illustrated in FIGS. 3*a* and 3*b*, the first air pathway portion 38 and the second air pathway portion 40 are non-collinear and non-planar. Non-collinear means the first and second airway portions 38, 40 do not extend in a straight line. Non-planar means that the first and second airway portions 38, 40 are not aligned in the same plane.

Figure 3C:
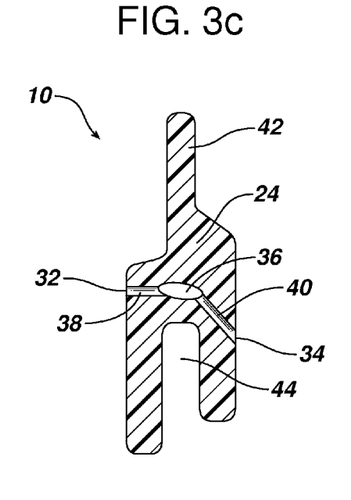
FIG. 3c is a cross-sectional view of one embodiment of the air vent wherein the first and second portions of the air pathway are planar but non-collinear.

FIG. 3*c* is a cross-sectional view illustrating an additional embodiment wherein the first and second air pathway portions 38, 40 are non-collinear but are planar.

Figure 4:
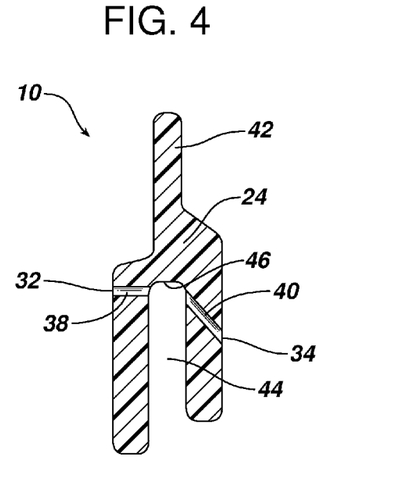
FIG. 4 is a cross-sectional view of another embodiment incorporating a window channel in communication with the first and second portions of the air pathway.

FIG. 4 illustrates yet another embodiment wherein the elongated window channel 44 extends to and is in communication with the first and second air pathway portions 38, 40 and there is no separate central cavity. When the window is fully closed in this embodiment, the top of the window engages the top 46 of the window channel 44 thereby closing off the air pathway 30 by interrupting flow between the first portion 38 and second portion 40.

Figure 5:
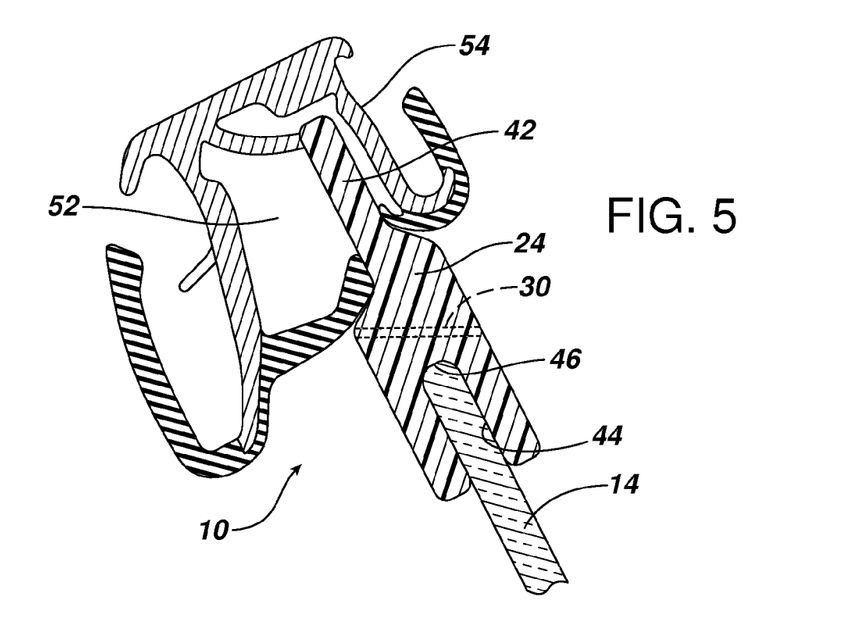
FIG. 5 is a cross-sectional view of yet another embodiment wherein the air pathway is separate from the window channel. This figure also illustrates the manner in which the elongated mounting flange of the air vent is received in the standard window gasket of the vehicle.

FIG. 5 shows yet another embodiment wherein the air pathway 30 comprises a straight path from the first opening 32 to the second opening 34. In this embodiment note that the elongated window channel 44 does not extend into communication with the air pathway 30 and thus the air pathway is always open even when the window is fully closed.

Figure 6:
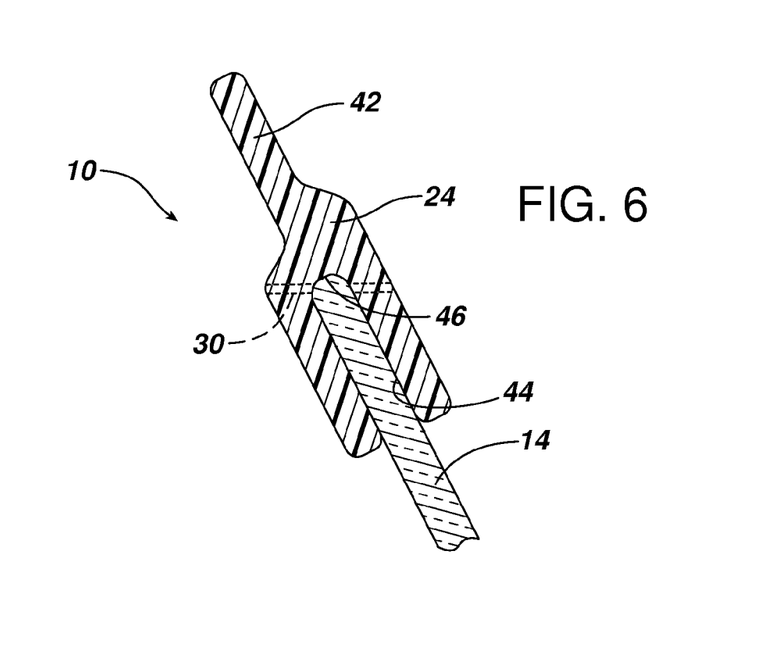
FIG. 6 illustrates another embodiment similar to the FIG. 5 embodiment except for the fact that the window channel extends to and communicates with the first and second portions of the air pathway.

In contrast, in the FIG. 6 embodiment, the elongated window channel 44 extends into communication with the air pathway 30 so that when the window is fully closed, the air pathway 30 is closed between the first portion 38 and the second portion 40 to prevent any air circulation through the air pathway.

Figure 7:
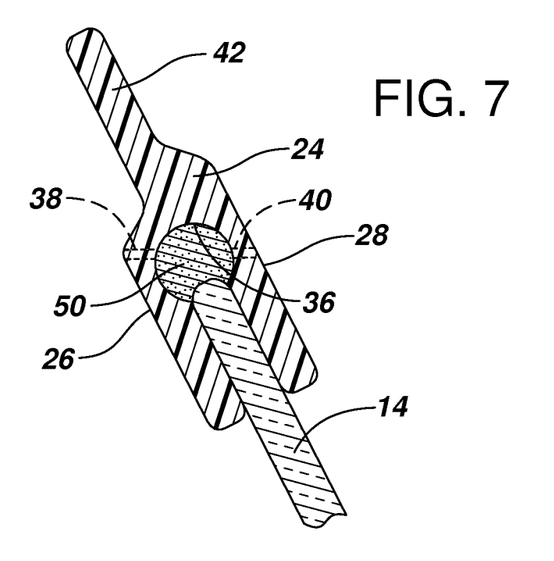
FIG. 7 illustrates yet another embodiment wherein the air vent incorporates a central cavity which receives and holds a filter.

In the embodiment illustrated in FIG. 7, a filter 50 is provided in the central cavity 36 between the first and second air pathway portions 38, 40. The filter 50 may be made from any appropriate material including, for example, porous foam, paper microfilter, plastic microfilter, water vapor barrier membrane and combinations thereof. Further, the filter 50 may include activated carbon or other appropriate material for deodorizing air and capturing contaminants that may otherwise pass through the air vent from the exterior to the interior of the vehicle under certain operating conditions. This filter 50 may be made in the shape of a rod which is pushed upward into the cavity 36.

In any of the illustrated embodiments, the one-piece body 24 may be made from a plastic or elastomeric material with a material durometer optimized between hardness and flexibility. The body 24 must have sufficient stiffness to allow proper mounting in the window frame. The material may be selected from a group of materials including, but not limited to, nylon, ABS, polyethylene, polypropylene, polylactic acid (PLA), stereolithography (SLA) resins (liquid UV-curable photopolymers) and combinations thereof. The material may incorporate various additives including, for example, UV protectants, anti-squeak agents such as polytetrafluoroethylene and colorants to, for example, blend with the tinted glass or match the body color of the vehicle. Of course, the material must withstand extreme temperatures and temperature cycles.

In any of the embodiments a water repellant film may be provided in the air pathway 30. Such a water repellant film may comprise a porous membrane made from, for example, expanded polytetrafluoroethylene material such as sold under the trademark GORE-TEX®. Other useful film materials include porous metal film and porous plastic film that include a number of tiny holes or apertures.

As best illustrated in FIG. 5, the air vent 10 may be mounted in the window frame by inserting the elongated mounting flange 42 into the channel 52 in the window weather stripping 54 which is designed to receive and hold the closed window 14. Since the air vent 10 is made from a single piece of plastic or elastomeric material with no moving parts, it will operate over a long service life without rattling, squeaking or producing any other sounds that might otherwise annoy an occupant of a vehicle.

As should be further appreciated, the exterior face 28 of the illustrated embodiments is flat so as to provide an aerodynamically neutral surface which does not create any currents or any whistling or other wind noises when the vehicle is operated at speed. At the same time, the air pathway 30 which typically comprises a plurality of air pathways extending from a plurality of first openings 32 to a plurality of second opening 34 along the length of the air vent allows for excellent passive cooling of the vehicle. More specifically, the temperature of the air inside the vehicle at rest in the hot summer sun rapidly rises. The heated air produces a positive pressure which forces the hottest rising air out through the air pathway 30.

Typically, the first and second portions 38, 40 of the air pathway 30 have a diameter of a maximum of about 5 mm. In one possible embodiment, the pathways 30 have a diameter of between 2 mm and 3 mm. The diameter of the first and second portions 38, 40 of the air pathway 30 need not be the same. Further, the portions 38, 40 of the air pathway 30 may be of constant diameter or tapered. In one embodiment the portion 38 is tapered and the portion 40 is constant. The larger end of the tapered portion 38 may be open to the interior of the vehicle.

Figure 8:
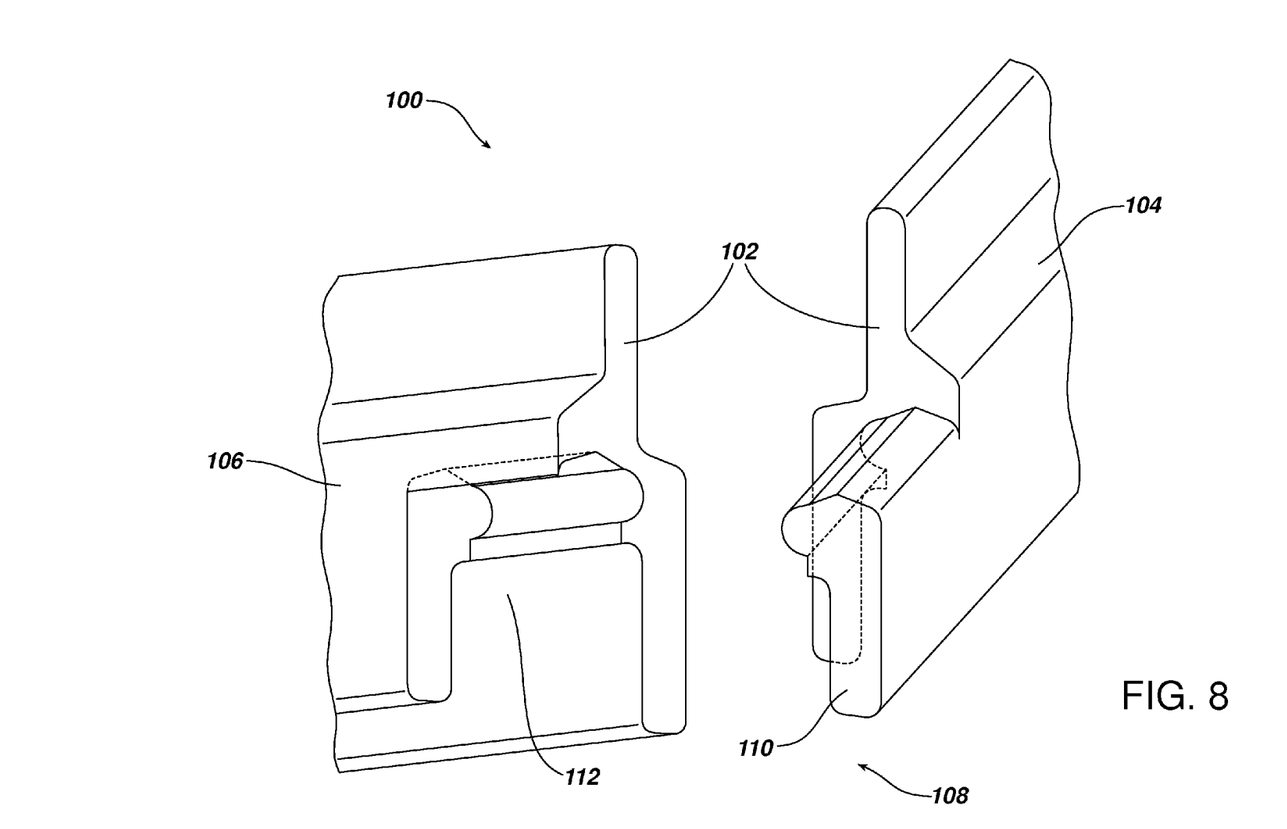
FIG. 8 illustrates an alternative embodiment of air vent incorporating a two piece body.

The foregoing has been presented for purposes of illustration and description. It is not intended to be exhaustive or to limit the embodiments to the precise form disclosed. Obvious modifications and variations are possible in light of the above teachings. For example, while a one-piece body is illustrated in FIGS. 1, 2, 3*a*-3*c* and 4-7, it should be appreciated that for certain applications it may be desirable to make the body from multiple pieces that are joined together. FIG. 8 illustrates just such an air vent embodiment 100 including a body 102 made from a first segment 104 and a second segment 106 joined together by means of a lap joint 108 to provide a friction fit. More specifically tab 110 on segment 104 is received in the matching recess 112 on segment 106. If desired an optional adhesive may be utilized in order to complete a secure connection. All such modifications and variations are within the scope of the appended claims when interpreted in accordance with the breadth to which they are fairly, legally and equitably entitled.

What is claimed:

1. An air vent for mounting in a vehicle window frame, comprising:
   a one-piece body having an interior face and an exterior face;
   an air pathway extending from a first opening in said interior face to a second opening in said exterior face;
   a water repellent film is provided in said air pathway; and
   an elongated window channel in said body.

2. The air vent of claim 1, wherein said air pathway extends downwardly from said first opening to said second opening.

3. The air vent of claim 1, wherein said water repellent film is selected from a group of materials consisting of a porous membrane, porous metal film, porous plastic film, expanded polytetrafluoroethylene and combinations thereof.

4. The air vent of claim 1, wherein said air pathway includes a central cavity, a first portion of said air pathway extending between said first opening and said central cavity and a second portion of said air pathway extending between said second opening and said central cavity.

5. The air vent of claim 4, wherein said first portion and said second portion of said air pathway are non-collinear.

6. The air vent of claim 4, wherein said first portion and said second portion of said air pathway are non-planar and non-collinear.

7. The air vent of claim 4, wherein said air pathway further includes multiple first portions and multiple second portions in communication with said central cavity.

8. The air vent of claim 7, further including a filter received and held within said central cavity.

9. The air vent of claim 8, wherein said filter is made from a material selected from a group consisting of cellulose, porous foam, paper microfilter material, plastic microfilter material, expanded polytetrafluoroethylene, silicone coated material and combinations thereof.

10. The air vent of claim 8, wherein said filter incorporates activated carbon.

11. The air vent of claim 7, wherein said body includes an elongated mounting flange and is formed as a single piece.

12. The air vent of claim 11, wherein said elongated window channel and said elongated mounting flange extend along two parallel longitudinal axes.

13. The air vent of claim 12, wherein said window channel is open to said central cavity.

14. The air vent of claim 12, wherein said central cavity is separate from said window channel.

15. The air vent of claim 12, wherein said body is made from a material selected from a group consisting of nylon, ABS, polyethylene, polypropylene, polylactic acid (PLA), stereolithography resins and combinations thereof.

16. The air vent of claim 12, wherein said body has a h-shaped cross section.

17. The air vent of claim 1, wherein said body includes an elongated mounting flange.

18. The air vent of claim 17, wherein said body includes an elongated central cavity between said elongated mounting flange and said elongated window channel.

19. The air vent of claim 1, wherein said window channel is open to said air pathway.

* * * * *